United States Patent [19]
Webster

[11] 4,090,318
[45] May 23, 1978

[54] ADJUSTABLE BUOYANCY FISHING BOBBER

[76] Inventor: Ronald F. Webster, 14706 Beachview Ter., Dolton, Ill. 60419

[21] Appl. No.: 745,008

[22] Filed: Nov. 26, 1976

[51] Int. Cl.² .............................................. A01K 93/00
[52] U.S. Cl. .................................... 43/43.14; 43/44.92
[58] Field of Search ................. 43/43.14, 44.92, 43.1, 43/3

[56] References Cited

U.S. PATENT DOCUMENTS

| 893,173 | 7/1908 | Kunze | 43/17.2 |
|---|---|---|---|
| 2,955,379 | 10/1960 | Hull | 43/44.95 |
| 3,664,053 | 5/1972 | Beverly | 43/43.14 |
| 3,747,257 | 7/1973 | Olsen | 43/43.14 |

*Primary Examiner*—Clifford D. Crowder
*Attorney, Agent, or Firm*—Sabin C. Bronson

[57] ABSTRACT

An adjustable buoyancy fishing bobber is provided having a body portion of cylindrical shape with accordian pleated sides running the full length of the body portion. At one end the cylindrical body portion is closed with an axially extending round post projecting therefrom with a small ball at the end of the post. Passing through the center of the ball is a transversely extending round hole, and a slit extends from the side of the post inwardly to the transverse hole. The other end of the body portion is provided with a short threaded axial extension of smaller diameter for application thereto of a plastic screw-on closure cap. The bobber body is made of a soft flexible plastic which may be compressed along the accordian pleats. The fish line runs from the hook through the hole in the ball at the end of the round post, up and over the top of the threaded extension at the other end of the body portion, which is then clamped in place by a second snap-cap attached to the lower screw-on portion.

2 Claims, 5 Drawing Figures

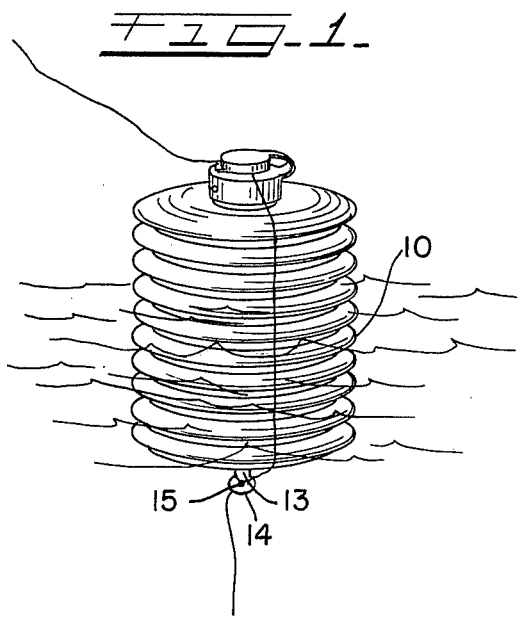
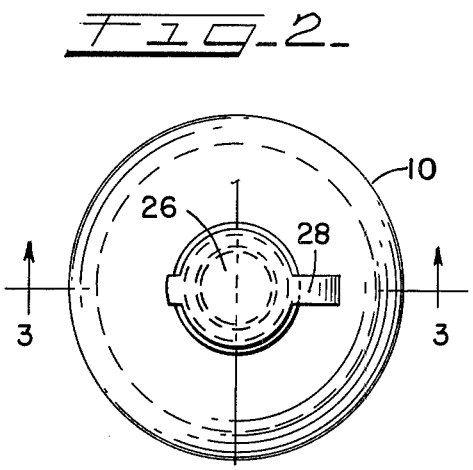
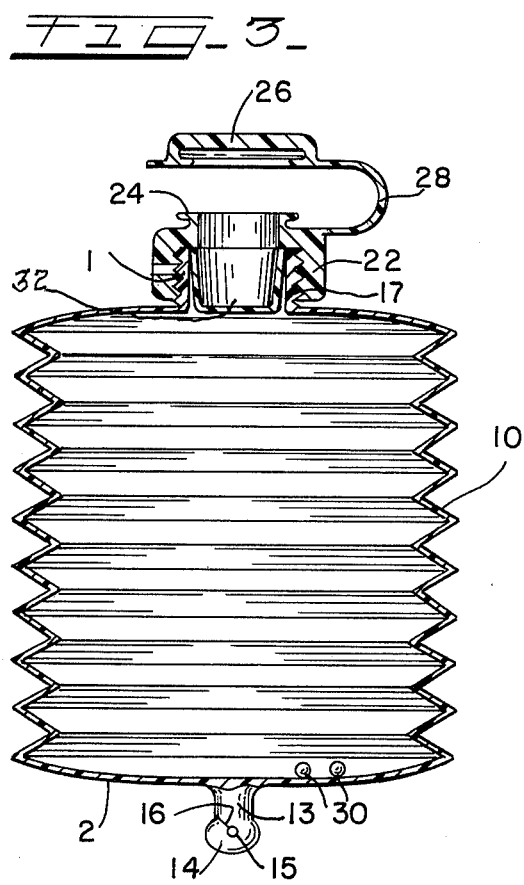
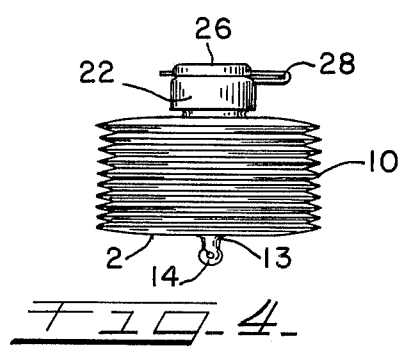
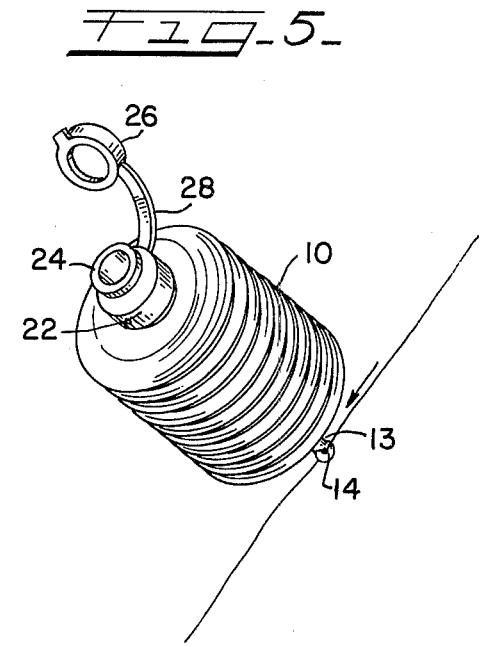

ADJUSTABLE BUOYANCY FISHING BOBBER

BACKGROUND AND SUMMARY OF THE INVENTION

This invention relates to a fishing bobber, constructed so that it may provide adjustable buoyancy, also having means whereby on a strike the bobber will be released and may slide on the line toward the hook. Also means is provided so that a sound may emanate from the bobber due to wave action keeping the bobber in motion in the water.

BRIEF DESCRIPTION OF THE DRAWINGS

Referring now to the drawings forming part of this application and wherein like reference characters indicate like parts:

FIG. 1 is a perspective view of the bobber with a fishing line attached thereto.

FIG. 2 is a top plan view of FIG. 1.

FIG. 3 is an enlarged cross sectional view on the line 3—3 of FIG. 2.

FIG. 4 is a side elevation of the bobber, compressed to reduce buoyancy.

FIG. 5 is a perspective view of the bobber as it would appear when the line is released from the cap.

DESCRIPTION OF THE PREFERRED EMBODIMENT

In the drawings the numeral 10 indicates the hollow cylindrical body portion which has accordian pleated sides running around the body the entire length thereof. The body portion is closed at one end 2 which end is provided with an axial post 13 extending therefrom and terminating in a round ball 14, which has a small hole 15 extending transversely therethrough, and a diagonally disposed slit 16 extending from the edge of the ball to the hole 15. This slit is to provide ease in threading the fish line laterally into the hole 15.

At the other end of the bobber a short, axial, threaded, hollow neck 17, extends, much like a screw type bottle opening. The closure for this neck comprises a screw-on cap portion 22 which screws down over the neck 17 and makes a complete seal when screwed down against the top of the neck. A lip 24 extends annularly around the rim of the cap to receive the snap-on cap 26 which snaps on and off the lip 24 when sufficient pressure is applied. The snap-on cap 26 is connected to the cap 22 by a flexible strap-like element 28.

Where it is desired that the bobber be at a particular location in the fish-line, that part of the line is brought up and over the lip 24, so that when the snap-cap 26 is pressed down over the line and lip 24, the bobber is held at that position on the line. But when a jerk of moderate magnitude is exerted on the line the cap 26 snaps off and then the bobber is free to slide on the line down to the hooked fish and not interfere with the landing of same.

If it is desired to lessen the buoyancy of the bobber the cap is removed, the body portion is compressed the limit as shown in FIG. 4, and the cap is reapplied to again seal the bobber, whereby the bobber will sink to a lower level in the water. The amount of buoyancy may be varied by varying the amount of air within the bobber. The buoyancy is directly proportional to the amount of air within the bobber.

As an added feature to the bobber, sound may be generated in the water by putting small lead shot or beads 30 into the bobber which will roll around therein due to the action of waves or the like, causing sound which travels in the water, attracting fish.

As further clarification to the design of the cap portion of the bobber, there is an optional feature, which may be incorporated. This is a slightly tapering, cylindrical extension 32, which tapers and extends downward from the inside of the lower portion of the cap and is closed at its lower end. When the cap unit, with this optional feature, is screwed onto the bobber body, this closed cylindrical extension will fill the gap otherwise left by the neck of the bobber body. When in place, the closed end of the extension provides a smooth, continuous surface with the inside top circle of the bobber body.

In the event that the bobber is attached to the fishing line in an inverted position, this cap extension would keep the sound producing balls from falling into the neck of the bobber body. Therefore, this extension would allow the balls maximum freedom of movement to produce full sound capabilities, when the bobber is attached to the line in an inverted position.

I claim:

1. An adjustable buoyancy fishing bobber comprising a hollow cylindrical resilient body portion with accordian pleated sides its entire length and closed at one end, an axial post extending from said closed end, said post having a transverse opening therethrough for threading a fish line through said opening, the other end having an axial threaded neck projecting therefrom, a two-part cap, one part being screw-threadedly applicable to said neck to seal said neck, a lip extending about the rim of said part, and a second part shaped to snap on and off the lip upon application of sufficient pressure, and providing means to clamp said fish line therebetween and hold said bobber in place on said line, whereby the cap may be loosened, the bobber body compressed along its accordian pleats to the desired buoyancy, and held in that position by screwing the cap down to seal the neck.

2. A fishing bobber as specified in claim 1 wherein said second part is provided with a cylindrical extension which tapers and extends downwardly from the top of said cap within said neck, the bottom of said extension being closed, and when said cap is applied on said neck, said bottom is flush with the upper part of said body portion, providing a smooth surface inside the top of the bobber.

* * * * *